United States Patent [19]

Schonger

[11] 4,364,129

[45] Dec. 21, 1982

[54] WATER SAVING FLUSH SYSTEM

[76] Inventor: John S. Schonger, R.D. 1 Box 231A, West Hurley, N.Y. 12491

[21] Appl. No.: 859,677

[22] Filed: Dec. 12, 1977

[51] Int. Cl.³ .............................................. E03D 1/14
[52] U.S. Cl. .......................................... 4/324; 4/393; 4/415
[58] Field of Search .................. 4/324, 393, 392, 378, 4/415, 400, 403, 326

[56] References Cited

U.S. PATENT DOCUMENTS

| | | | |
|---|---|---|---|
| 1,718,744 | 6/1929 | Koropczyk | 4/324 |
| 3,036,313 | 5/1962 | Jenkins | 4/324 |
| 3,059,242 | 10/1962 | Bachli et al. | 4/400 |
| 3,438,064 | 4/1969 | Taien | 4/403 |
| 3,812,545 | 5/1974 | Lanahan | 4/324 |
| 3,894,299 | 7/1975 | Cleary | 4/326 |
| 3,908,203 | 9/1975 | Jackson | 4/324 |
| 3,955,218 | 5/1976 | Ramsey | 4/324 |

Primary Examiner—Lenard A. Footland
Attorney, Agent, or Firm—Joseph J. Connerton

[57] ABSTRACT

A toilet flush system designed for manual control of the amount of water used for a toilet flush cycle uses a tank ball, flapper valve, or other type valves to control the closing of a reservoir outlet at selected times prior to or upon completion of the normal flush cycle. The tank ball or flapper valve is modified to overcome its buoyancy such that it rapidly closes the tank reservoir to thereby terminate the flush cycle when the handle of the toilet is released. By maintaining the handle in the operated position, the individual flush cycle can be controlled dependent on the waste to be disposed of, thus permitting a significant saving in fresh water. The buoyancy of the valve is overcome by utilizing a water absorbing material such as sponge material within the valve which, when primed, increases the weight of the valve.

5 Claims, 2 Drawing Figures

WATER SAVING FLUSH SYSTEM

BACKGROUND OF THE INVENTION

A primary concern for protection of the ecology in today's society includes protection and conservation of natural resources such as water. Extended periods of drought occurring in various regions of the United States including normally arid regions generally requires severe water use restrictions accompanied by bans on water consuming activities such as lawn or garden watering, car washings, etc., and in many cases water rationing for other domestic uses. Thus domestic water conservation, especially in urban areas, has become increasingly important.

One major source of water overconsumption which has not been satisfactorily regulated to date relates to the amount of fresh water utilized for domestic toilet flushing. Conventional toilet flush tanks are generally arranged so that the operation of the handle actuates a valve lever, causing the entire contents of the tank to be emptied during each flush cycle. Toilets do not in most cases require a complete flush, particularly where liquid or children's wastes are involved, and substantial water conservation can be accomplished by limiting the amount of water used in a toilet flush cycle.

Various methods and devices for limiting the water used for toilet flushing using either conventional ball type or flapper flush valves have been proposed, including placing objects such as bricks in the tank, dual flush systems in which the amount of water used in a flush cycle depends on whether a full or partial flush is selected, etc. However, such methods and devices are either ineffective or relatively complex and expensive, require substantial alteration to the valve itself or the installation of multiple controls inside the tank, external thereto or on the tank handle assembly. Other systems provide two preset discharge volumes, while a discharge volume between these preset flush cycles may provide maximum flush efficiency. In addition, various methods have been proposed in the art for overcoming the buoyancy of a tank ball or flapper valve such as by adding weights thereto to permit termination of the flushing cycle when the handle is released. However, many of these devices require consumer installation or do not meet consumer acceptance. Conventional toilet tanks contain a reservoir of from three to eight gallons of water, and it has been estimated that a family of four using an average of 2 to 2.5 gallons of water per toilet flush could save using the subject invention approximately 20,000 gallons of fresh water per year. Such water saving, when multiplied by the number of toilets in a community or water district, would produce dramatic savings, particularly in multiple dwelling units such as apartments or condominiums, and have a substantial effect on a locality's water resources. In addition to savings in water bills, the use of lesser amounts of water help reduce the overload in sewage systems, septic tanks, and leeching systems.

SUMMARY OF THE INVENTION

In accordance with the present invention, there is provided a control system for manually controlling the amount of water used for toilet flushing cycles in accordance with the type of waste to be disposed of. The invention operates by effectively decreasing the buoyancy of the flush control valve whereby the flushing cycle can be terminated at any specified time by releasing the handle of the flush assembly. In one embodiment, the flush control device is a valve assembly comprising a conventional tank ball valve having a water absorbing material such as a sponge contained therein, the weight of the valve when primed with water causing it to sink and seat immediately when released. In another embodiment, the flush control device is a similarly modified flapper valve assembly. By merely substituting one of the improved valve assemblies for the conventional valve assemblies in the tank, no further modification of the toilet assembly is required, and the modified valves comprise ready replacements for the conventional valves. Manual control of the flush cycle is provided by maintaining the control handle of the tank in the operated position until the time to terminate the flush, when it is released, and the flush cycle terminated in the above described manner.

Accordingly, a primary object of the present invention is to provide an improved toilet tank flush control system which will permit substantial water saving by controlling the duration of the flush cycle.

Another object of the present invention is to provide improved toilet flush control valves including water absorbing material within the valves adapted to utilize the water in the tank to increase the weight and overcome the buoyancy of the valve, thereby permitting manual control of the toilet flush cycle.

Still another object of the present invention is to provide a modified tank ball or flapper valve assembly of simple construction and interchangeable with conventional toilet valve assemblies to provide manual flush cycle control.

DESCRIPTION OF PREFERRED EMBODIMENTS

Figure 1:
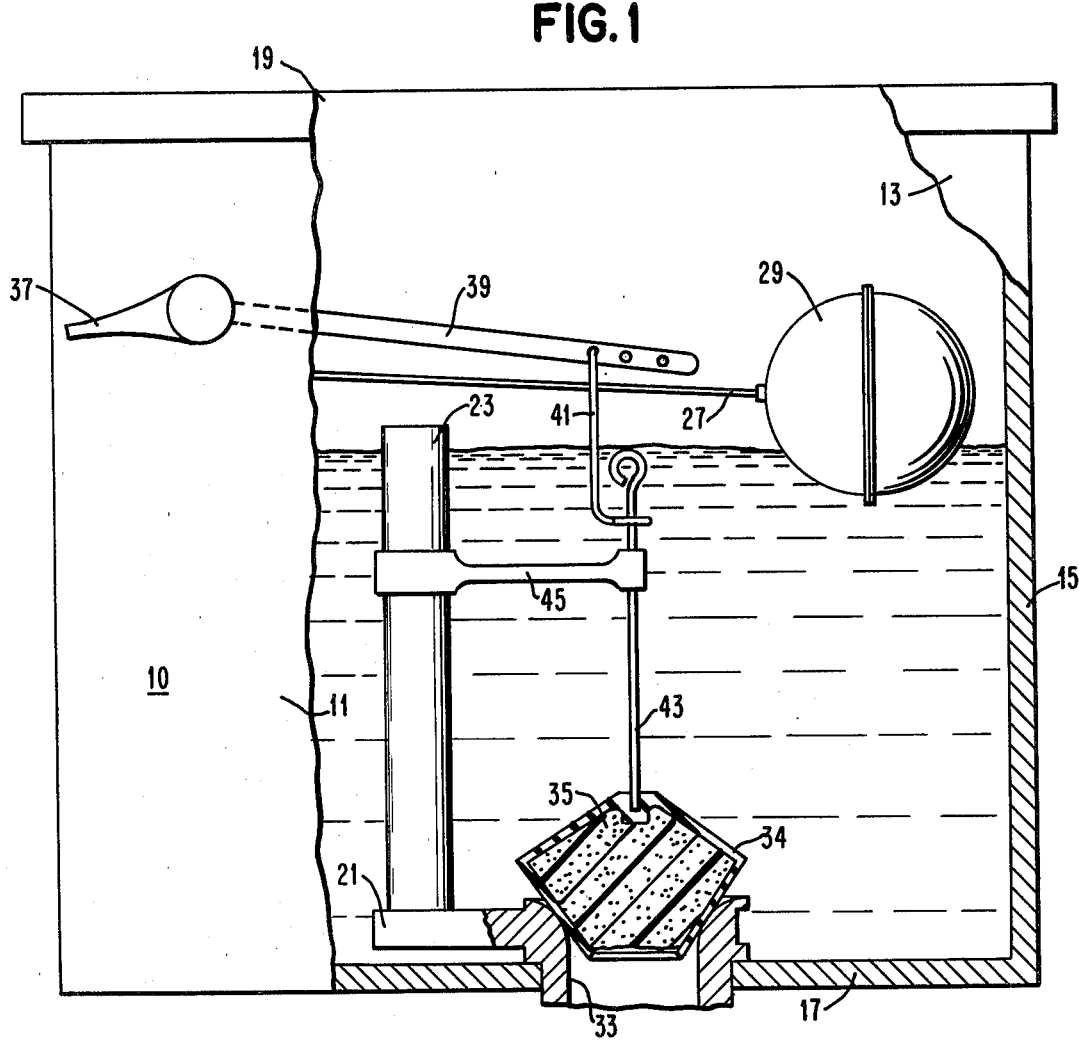
FIG. 1 is an elevation view partly in section of a manually controlled flush tank assembly utilizing a tank ball valve in accordance with the instant invention.

Referring now to the drawings and more particularly to FIG. 1 thereof, there is illustrated a view partly in section of a preferred embodiment of the instant invention utilizing a tank float valve assembly. Since conventional domestic toilet bowl assemblies are generally of either the tank ball or flapper valve variety, separate embodiments of the invention are designed for use with each of the flush control devices. A conventional toilet tank assembly 10 comprises a front wall 11, a back wall 13, side and bottom walls 15, 17, and a cover 19. Water is provided to the tank through a conventional water inlet connection attached to a water supply pipe, which in turn is connected to a conventional valve control assembly. Since the water inlet and associated control systems are considered conventional and beyond the scope of the instant invention, they have been omitted from the drawings in the interest of clarity. Float arm 27 is connected to the water inlet valve (not shown) and a float ball 29. The inlet valve is closed by ball float 29 and associated float arm 27 when the water within the tank reaches the prescribed level for which it is adjusted. An overflow pipe or tube 23 is provided to prevent water overflow within the tank, while a delivery pipe 33 connects the output from the tank to the toilet bowl. Alternatively, the tank may have a preformed exit for connection to the toilet bowl. A tank ball valve 34 maintains the water in the tank, and when moved upwardly during the flush cycle, as more fully described hereinafter, allows the water from the tank to flow through the delivery pipe 33 to flush the toilet bowl. Handle 37 of the tank controls a trip lever 39, which connects through linkage 41 to lift rods 43, which in turn control the vertical motion of the tank ball valve 34. A guide 45 connected to overflow pipe 23 provides vertical alignment for the lift rod 43.

In conventional toilet flush tanks, the float valve is filled with air and buoyant, such that operation of the toilet handle would cause the tank ball valve to rise during the flush cycle, permitting the entire contents of the tank to be emptied. However, in the instant invention, tank ball valve 34 is filled or lined with water absorbing material 35 such as sponge, which, when primed in a manner described hereinafter, absorbs water, increasing the weight of the tank ball 34 and thereby substantially eliminating its buoyancy so that it immediately descents and closes the reservoir outlet 33 when it is not held in the up position by the trip lever 39. It should be noted that the priming operation is only necessary before or at the time when the tank valve is initially installed. When operated in this manner, the amount of water released from the tank into the bowl will vary directly as the length of time the handle is held depressed. In this way complete manual control on the amount of water released is provided so that only the minimum amount of water required for a particularly flush is utilized. When initially installed, the tank ball 34, made of rubber or soft plastic, is primed by squeezing within the water several times, causing it to absorb the necessary quantity of water to eliminate the buoyancy. The tank ball 34 is shaped like a flat bottomed inverted cone and, as previously described, is open on the bottom to permit water from the tank to be absorbed by water absorbing material 35.

Figure 2:
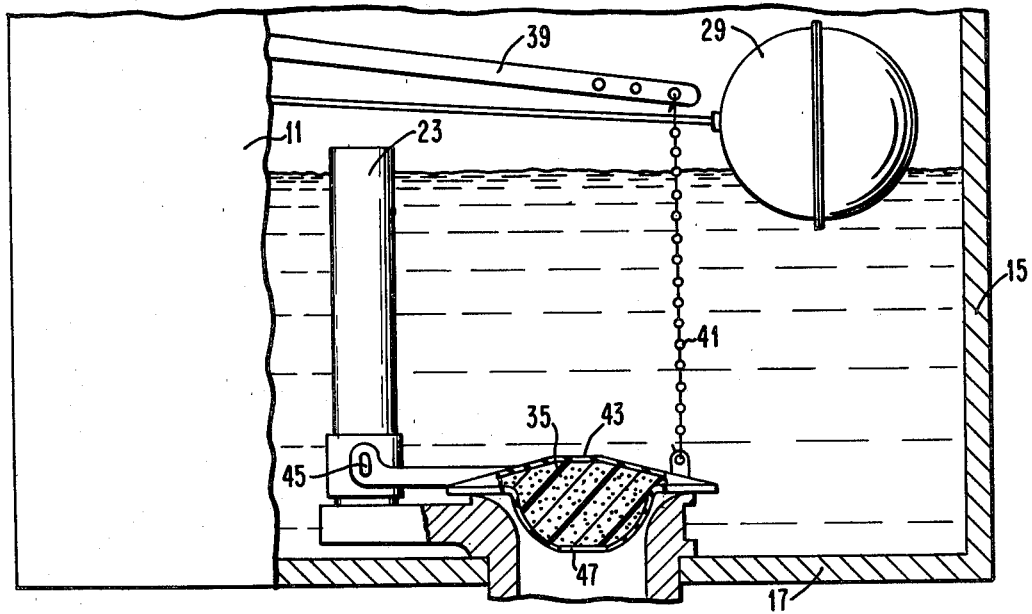
FIG. 2 is a sectional elevation view of a manually controlled toilet flush tank assembly utilizing a flapper valve assembly in accordance with the instant invention.

The above described arrangement is adapted for toilets of the tank ball valve control type. A second embodiment of the invention utilizes a flapper valve assembly as the flush control device. Referring to FIG. 2, elements corresponding to those shown in FIG. 1 are identified by similar subscripts. The flapper valve arrangement is similar to the tank ball arrangement except that a flapper valve replaces the tank ball, and is connected through a direct linkage, such as a pull chain or cord 41, to the trip lever 39. Flapper valve 43 is permanently positioned within the bowl, but pivots about hinge 45 when pull cord 41 is moved upwardly by action of handle 37 (FIG. 1). Like the tank ball embodiment, the buoyancy of the flapper valve is eliminated by priming with water as tank ball embodiment of FIG. 1 to increase the weight and thereby overcome the normal buoyancy of flapper valve 43. As the tank ball embodiment of FIG. 1, the flapper valve 43 is filled or lined with a water absorbing material 35 and open on its bottom portion 47. Manual control of the flapper valve is provided in the same manner as the tank ball embodiment. By maintaining the handle in the operated position, water will be discharged from the tank into the toilet bowl through the bottom exit of the tank. When the handle 37 is released, the trip lever 39 is also released, and the weighted flapper valve 43 immediately seats over the reservoir outlet.

By means of the above described invention, the amount of water used for a toilet flush may be substantially reduced. Flushes for liquid or children's wastes require substantially less water than full flushes, even less than half normal flushes at times, so that the savings are commensurate with the wastes. For a full flush, it is necessary only to hold the operating handle in the down position until the tank completely empties. The tank ball and flapper valves of the instant invention are designed to be interchangeable with the conventional standard valves which they replace, so that no skill or special tools are required for installation. While operation of the invention requires that the handle 37 be held in the operated position during the entire flush cycle, tests have indicated that this requirement did not pose a problem for users.

While the present invention has been shown and described relative to preferred embodiments thereof, it will be understood by those skilled in the art that other changes in form and detail may be made therein without departing from the spirit and scope of the instant invention. For example, the flush valve, either tank ball or flapper valve, could be made of moulded sponge rubber to eliminate the requirement for a separate sponge rubber filling. Alternatively, buoyancy of the flush valve could be eliminated by making the valve of heavier construction. The essential requirement is that the flush valve be so constructed that the combined weight of the valve and any filling thereof be adequate to overcome the normal buoyancy.

What is claimed is:

1. A toilet tank flushing assembly operable to discharge a controlled volume of water from a flush tank into a toilet bowl in accordance with the quantity and nature of the waste material to be flushed from the bowl comprising, in combination, a flush tank, a handle mounted on said flush tank, a valve seat disposed in the exit port of said tank, a flush valve adapted to engage said valve seat and thereby close said tank exit port, said flush valve having a substantially hollow interior portion with an opening in the bottom thereof, said interior portion of said flush valve including a water absorbing material adapted to modify the weight of said valve by controlling the amount of water admitted through said bottom portion of said flush valve, and a manually operated lever assembly connecting said handle to said flush valve, said modified flush valve being adapted to control the buoyancy of said float valve when said float valve is lifted from said valve seat and thereby control the reseating of said flush valve when said handle is released.

2. A device of the character claimed in claim 1 wherein said water absorbing material comprises a spongy material.

3. A device of the character claimed in claim 2 wherein said flush valve comprises a tank ball.

4. A device of the character claimed in claim 2 wherein said flush valve comprises a flapper valve.

5. A device of the character claimed in claim 1 wherein said opening in the bottom of said float valve is adapted to prime the water absorbing material within said valve with water to thereby overcome said buoyancy of said float valve.

* * * * *